United States Patent [19]
Alberni

[11] Patent Number: 5,413,462
[45] Date of Patent: May 9, 1995

[54] MECHANICAL POWER TRANSMISSION SYSTEM HAVING IMPROVED LUBRICANT CIRCULATION APPARATUS

[75] Inventor: Fred M. Alberni, Bellevue, Wash.

[73] Assignee: Reliance Electric Industrial Co., Greenville, S.C.

[21] Appl. No.: 207,593

[22] Filed: Mar. 8, 1994

[51] Int. Cl.6 ................... F16N 13/00; F04D 29/22
[52] U.S. Cl. .................. 415/169.1; 417/424.1; 184/6.23
[58] Field of Search .............. 415/169.1, 168.1; 417/424.1; 184/6.12, 6.22, 6.23, 104.1

[56] References Cited

U.S. PATENT DOCUMENTS

| | | |
|---|---|---|
| 3,638,773 | 2/1972 | Lewis et al. . |
| 4,068,740 | 1/1978 | Quinn et al. . |
| 4,106,606 | 8/1978 | Cory . |
| 4,183,425 | 1/1980 | Sommer . |
| 4,223,774 | 9/1980 | Sommer . |
| 4,234,123 | 11/1980 | Cory . |
| 4,415,067 | 11/1983 | Cory . |
| 4,463,841 | 8/1984 | Kelley . |
| 4,483,422 | 11/1984 | Cory . |
| 4,527,681 | 7/1985 | Sommer . |
| 4,648,494 | 3/1987 | Yater . |
| 4,938,321 | 7/1990 | Kelley et al. . |

OTHER PUBLICATIONS

Bulletin 340/360E—Published by Aurora Pump, A Unit of General Signal 800 Airport Road, North Aurora, Ill. 60542, dated 1988.
Brochure—Controlled Start Transmission system, published by Dodge (Reliance Electric), P.O. Box 499, Greenville, S.C., 29602, dated 1991.
Published Blueprint—Product: Cooling Control 630K, Part: Cooling Pump Assy 630K, Drawing No. 80311312, dated 1988.
Published Blueprint-Product: Cooling Control, Part: Cooling Pump Assy with Shell and Tube 630K, Drawing No. 80311315 (Sheet 1 of 2), dated 1989.

*Primary Examiner*—Edward K. Look
*Assistant Examiner*—Michael S. Lee
*Attorney, Agent, or Firm*—Dority & Manning

[57] ABSTRACT

A transmission system for transmitting mechanical power from a source of mechanical power to a power consuming load. The transmission system generally includes a controlled start transmission device or the like having an input shaft operatively connected to the source of mechanical power and an output shaft operatively connected to the power consuming load. Lubricant circulation apparatus are also provided to circulate and cool lubricant fluid maintained in a sump defined by the transmission device. Such lubricant circulation apparatus includes a centrifugal pump configured and mounted to remove air present in the circulating lubricant fluid. The pump is preferably mounted adjacent the transmission device upon a rigid fluid passage conduit.

26 Claims, 6 Drawing Sheets

MECHANICAL POWER TRANSMISSION SYSTEM HAVING IMPROVED LUBRICANT CIRCULATION APPARATUS

BACKGROUND OF THE INVENTION

The present invention relates generally to the art of mechanical power transmissions systems. More particularly, the present invention relates to a mechanical power transmission system having improved lubricant circulation apparatus.

Mechanical power transmission systems generally function to transmit mechanical power from a power source to a power consuming load. The speed or torque of the transmitted power may be varied as necessary or desirable to meet the exigencies of a particular application. For example, it is often desirable to control the degree of acceleration imparted to load by a prime mover, such as an electric motor. One transmission device utilized for this purpose is frequently referred to as a controlled start transmission. A controlled start transmission incorporates a multiple-disc clutch mechanism which may be selectively controlled as desired to regulate such acceleration.

An application in which controlled start transmissions are frequently employed is that of a belt conveyor system for transporting bulk materials. Conveyors of this type are frequently lengthy, and incorporate a plurality of drive motors spaced apart along their length. For example, it is not unusual for a belt conveyor utilized in a mining operation, such as coal or ore, to exceed a length of one mile or more. Generally, each of the drive motors spaced apart along the length of the conveyor would have a respective controlled start transmission associated therewith. In addition to controlling acceleration imparted to the belt conveyor during start up, these controlled start transmissions may be utilized during operation of the conveyor to effect substantially equivalent load sharing between each of the drive motors.

Mechanical devices such as controlled start transmissions, as well as ordinary speed reducers and other gear boxes, often generate a significant amount of heat during operation. This heat may be dissipated by circulating cooling fluid through an appropriate heat exchanger. Frequently, this cooling fluid may be the lubricant fluid also used to lubricate internal components of the particular mechanical device. Depending on the requirements of the particular application, the heat exchanger may be any one of several types, including a oil-air heat exchanger or a oil-water heat exchanger.

The lubricant fluid is circulated through the heat exchanger by an appropriate pump. Often, the lubricant fluid is pumped through the heat exchanger at a flow rate which, on a per minute basis, may exceed the capacity of the reservoir (or "sump") in which the lubricant fluid is maintained. For example, a flow rate exceeding 200 gallons per minute is not unusual in applications utilizing a controlled start transmission having a 50 gallon sump. In these applications, a centrifugal pump is generally preferred due the ability thereof to pump relatively large volumes of fluid without generating excessive pump noise levels.

In the past, the pumps utilized to produce such flow rates were often placed adjacent the heat exchanger in a location separate from the controlled start transmission itself. Additionally, these pumps were generally mounted such that the lubricant fluid was drawn into the pump impeller in a substantially horizontal direction. These prior art pumps, however, have been prone to several operational problems. For example, it was not unusual for these pumps to produce temporary discontinuities in flow of the lubricant fluid. Such temporary discontinuities have often been interpreted by electronic controllers as a system fault, thus leading to automatic shut down of the entire system, such as a belt conveyor system, with which the controlled start transmissions are being used. Additionally, internal seals within pumps have often failed more frequently than expected, thereby necessitating greater maintenance efforts than would otherwise be required.

SUMMARY OF THE INVENTION

The present invention recognizes and addresses the foregoing disadvantages, and others of prior art constructions and methods. Accordingly, it is an object of the present invention to provide a mechanical power transmission system having improved lubricant circulation apparatus.

It is also an object of the present invention to provide improved lubricant circulation apparatus for use with a mechanical device, such as a mechanical power transmission or a gear box.

It is another object of the present invention to provide an improved centrifugal pump device.

It is a further object of the present invention to provide novel means of mounting a pump to a gear box or other mechanical device.

Some of these objects are achieved by a transmission system for transmitting mechanical power from a source of mechanical power to a power consuming load. The transmission system generally includes an appropriate gear box having an input shaft operatively connected to the source of mechanical power and an output shaft operatively connected to the power consuming load. As used herein, it is to be understood that the term "gear box" includes any type of transmission or other suitable mechanical device with which principles of the present invention may be applicable.

The transmission system further includes lubricant circulation apparatus for circulating lubricant fluid maintained in a sump defined by the gear box. Such lubricant circulation apparatus includes an appropriate pump having a pump housing defining a pump inlet and a pump outlet. The pump is preferably a centrifugal pump mounted such that the lubricant fluid is operatively drawn upward into an impeller thereof from the pump inlet and passed to the pump outlet. Fluid inflow means provide fluid coupling between the sump and the pump inlet to permit inflow of the lubricant fluid from the sump. Fluid outflow means provide a fluid flow path between the pump outlet and the sump to permit return flow of the lubricant fluid back into the sump. A heat exchanger may be operatively connected in the return flow path of the fluid outflow means to dissipate heat in the lubricant fluid. Means are also provided for operatively driving an impeller of the pump.

Flow of lubricant fluid back into the gear box produces air bubbles in the lubricant fluid which have a tendency to remain therein for some length of time. In applications in which the lubricant fluid is poured back into the gear box at a relatively large flow rate, such air bubbles are pervasive. For example, visual inspection of lubricant fluid within a controlled start transmission after operation has been discontinued reveals that the lubricant fluid has a "foamy" appearance due to such air bubbles. Only after the lubricant fluid is allowed to settle in the sump for a significant length of time are such air bubbles eventually allowed to rise from the lubricant fluid. The present invention recognizes that such air bubbles have caused operational problems, some of which are discussed above.

Accordingly, the lubrication circulation apparatus further includes air removal means for facilitating removal from the centrifugal pump of air in the lubricant fluid. The air removal means preferably includes at least one air escape orifice defined in the impeller to provide fluid communication between the pump inlet and an upper portion of the pump housing. Such air escape orifice permits air appearing at the pump inlet to rise into the upper portion of the pump housing. An air exhaust hole defined in the upper portion of the pump housing then permits the air to exhaust therefrom.

In some presently preferred embodiments, two such air escape orifices are provided radially proximate to an axis of rotation of the impeller. Other presently preferred embodiments provide four air escape orifices at this location. The air escape orifices may have a diameter substantially one-fourth of an inch. It should be appreciated, however, that the number and size of such air escape orifices may be varied as desired so long as the function of air removal is facilitated while maintaining structural integrity of the impeller.

Preferably, the air exhaust means further includes an air return hose extending from the air exhaust hole to selectively direct air which may be exhausted from the upper portion of the pump housing. This air return hose may extend back to the gear box to permit lubricant fluid which may be present in the upper portion of the pump housing to flow back to the sump.

The lubricant circulation apparatus may further include mounting means for fixedly mounting the centrifugal pump at a location proximate to the gear box. Preferably, the mounting means maintain the pump housing in a substantially vertical orientation. In such embodiments, the pump housing may be mounted upon a rigid fluid passage conduit operatively coupled between the sump and the pump inlet. Preferably, the rigid fluid passage conduit comprises a longitudinal section of substantially rectangular tubing defining a fluid port in a top surface thereof. In this case, the pump housing is mounted such that the fluid port is generally in register with the pump inlet.

Other objects, features and aspects of the present invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures, in which.

Repeat use of reference characters in the present specification and figures is intended to represent same or analogous features or elements of the invention.

DETAILED DESCRIPTION OF THE PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Figure 1:
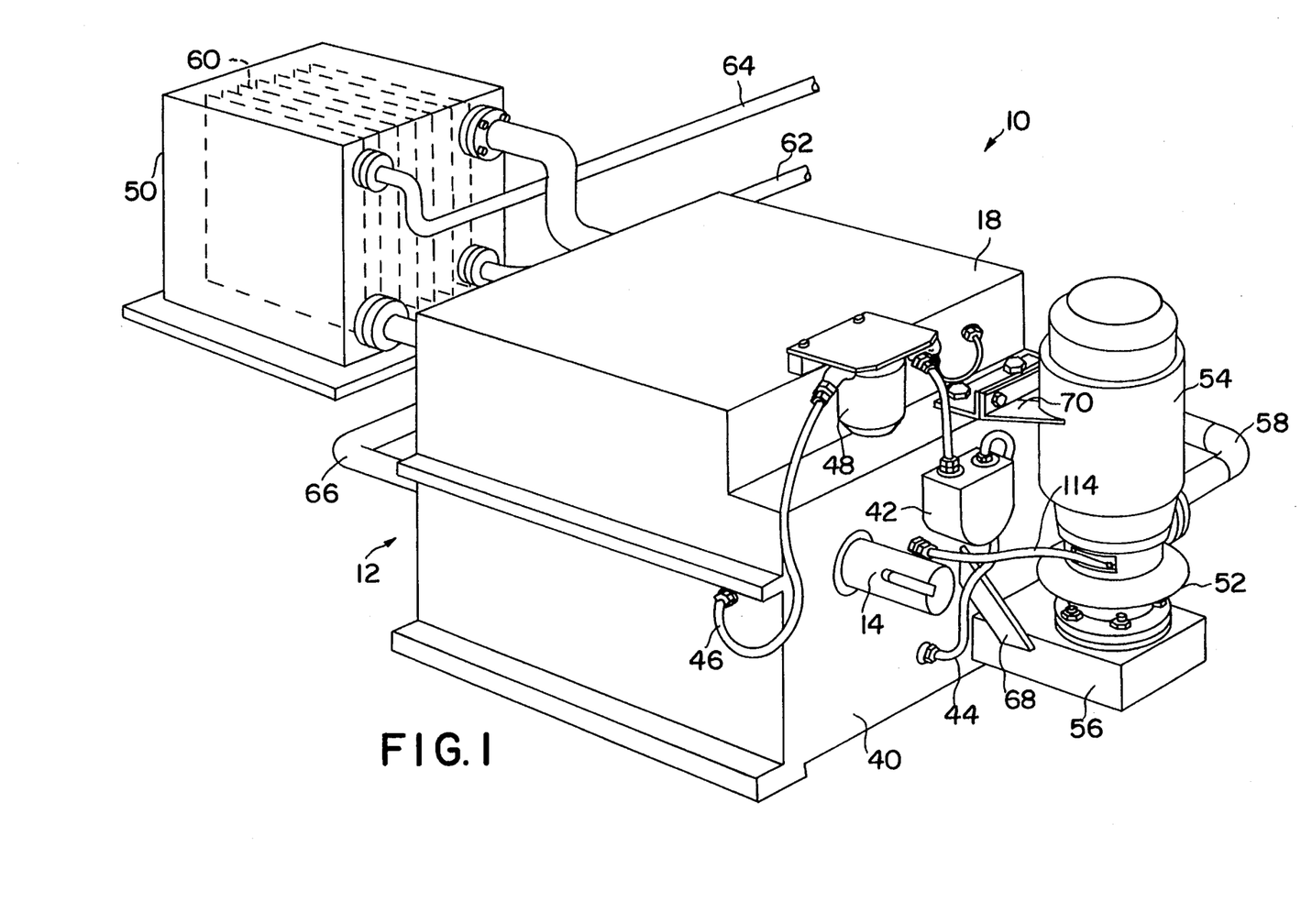
FIG. 1 is a perspective view of a transmission system including an improved lubricant circulation apparatus according to the present invention.

Referring to FIG. 1, a transmission system constructed in accordance with the invention is indicated generally at 10. Although the teachings of the invention are applicable to many types of mechanical devices, the illustrated transmission system 10 includes a controlled start transmission 12. As discussed above, controlled start transmissions are often utilized in belt conveyor systems and other applications where it is desirable to control the degree of acceleration imparted to the power consuming load by the power source. An appropriate controlled start transmission for this purpose is marketed under the trademark "Dodge CST" by Reliance Electric Co., which has an address of P.O. Box 499, Greenville, S.C. 29602.

Figure 2:
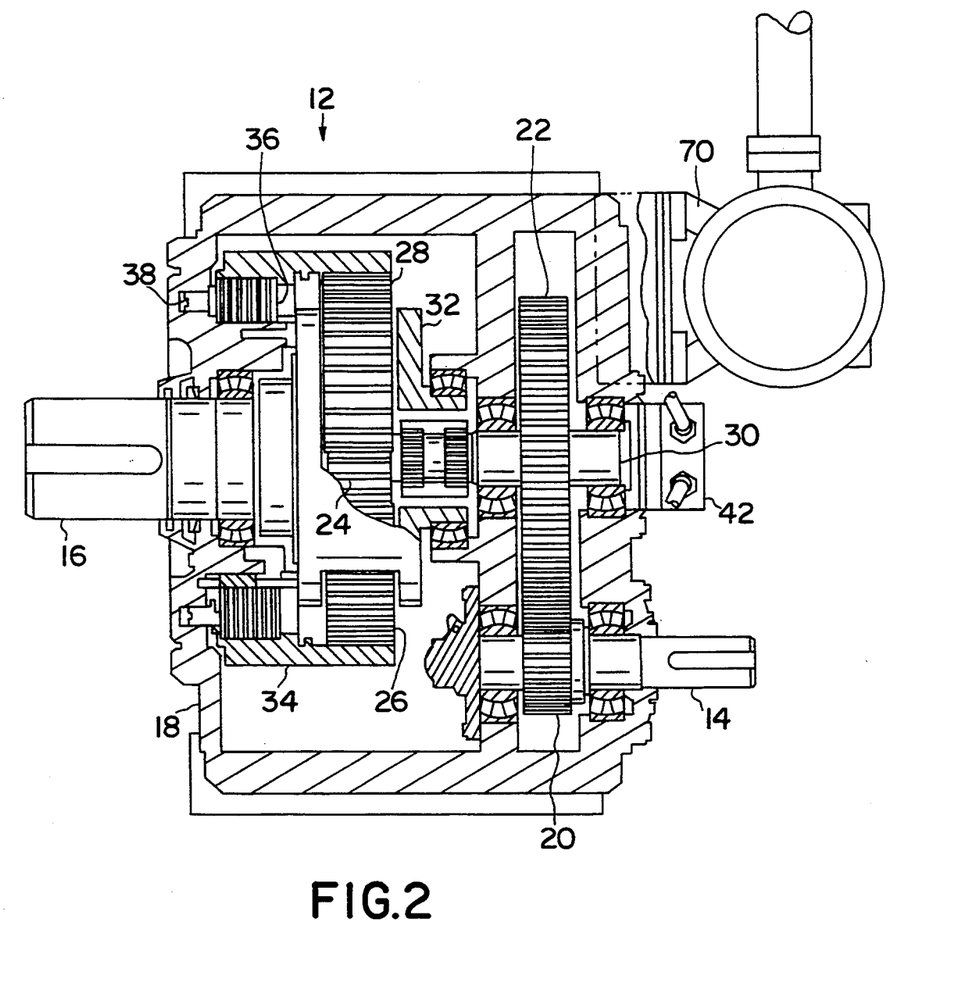
FIG. 2 is a plan view of a transmission device and pump of the transmission system shown in FIG. 1 in which a housing of the transmission device is partially cut away to illustrate some internal components thereof.

The operation of transmission 12 can be most easily understood with reference to FIG. 2. Transmission 12 includes an input shaft 14 and an output shaft 16 journalled into a transmission housing 18. Input shaft 14 is operatively connected to the power source, whereas output shaft 16 is operatively connected to the load. Transmission device 12 first increases the torque of the mechanical power by a concomitant reduction in the rotational speed. This is accomplished by the meshing engagement of a pinion gear 20 on input shaft 14 with an appropriate reducer gear 22.

Transmission 12 also includes means to selectively control the mechanical power transmitted from the input shaft the output shaft. Specifically, a transmission 12 may be controlled to selectively allow all or part of the torque developed by reducer gear 22 to be passed to output shaft 16. Toward this end, transmission 12 further includes a sun gear 24 about which a plurality of planet gears (typically three), such as planet gears 26 and 28, have been radially displaced. The sun gear is axially coupled to a shaft 30 upon which gear 22 is mounted.

The planet gears are mounted for relative rotation with respect to a planet carrier 32, which is integral with output shaft 16 in the exemplary construction shown. In some embodiments, planet carrier 32 and output shaft 16 may be separate components appropriately connected together. A floating ring 34 includes an interior gear portion in meshing engagement with the planet gears. Axially displaced from such interior gear portion, floating ring 34 includes a plurality of first annular plates extending radially inward. These first annular plates are interleaved with a plurality of second annular plates which are typically fixed to an interior portion of a separate piece bolted to housing 18, and referred to as the output housing. Collectively, the first and second annular plates form a plate assembly referenced as 36.

An annular piston 38 is situated adjacent plate assembly 36 within a substantially complementary recess defined in housing 18. Piston 38 is axially movable toward plate assembly 36 in response to hydraulic pressure introduced into the complementary recess. Movement of the annular piston back into the annular recess when the hydraulic pressure is removed is typically effected by a series of circumferentially spaced springs.

As can be seen, various rotational components of transmission drive 12 are provided with appropriate bearings as necessary or desirable. During operation, rotation of input shaft 14 causes sun gear 24 to begin rotating. Sun gear 24, in turn, rotates the planet gears maintained in planet carrier 32. If annular piston 38 is retracted into the complementary recess, the frictional engagement of the interleaved annular plates of plate assembly 36 will be lessened. Thus, floating ring 34 will be rotated by the planet gears, and output shaft 16 will deliver substantially no torque.

As annular piston 38 is actuated, the interleaved annular plates of plate assembly 36 are moved into frictional engagement. This results in application of torque to floating ring 34. As rotation of floating ring 34 is reduced at a controlled rate, planet carrier 32, and thus output shaft 16, will be rotated. In this manner, acceleration or other selective application of mechanical power between input shaft 14 and output shaft 16 may be effectively controlled.

Referring again to FIG. 1, a bottom portion 40 of housing 18 defines therein a sump for maintaining a lubricant fluid. A relatively small pump 42, which draws fluid from the sump via hose 44, may be provided to lubricate internal components within transmission device 12. The fluid returns to housing 18 by a return hose 46, into which an oil filter 48 may be connected to filter the lubricant fluid.

Figure 3:
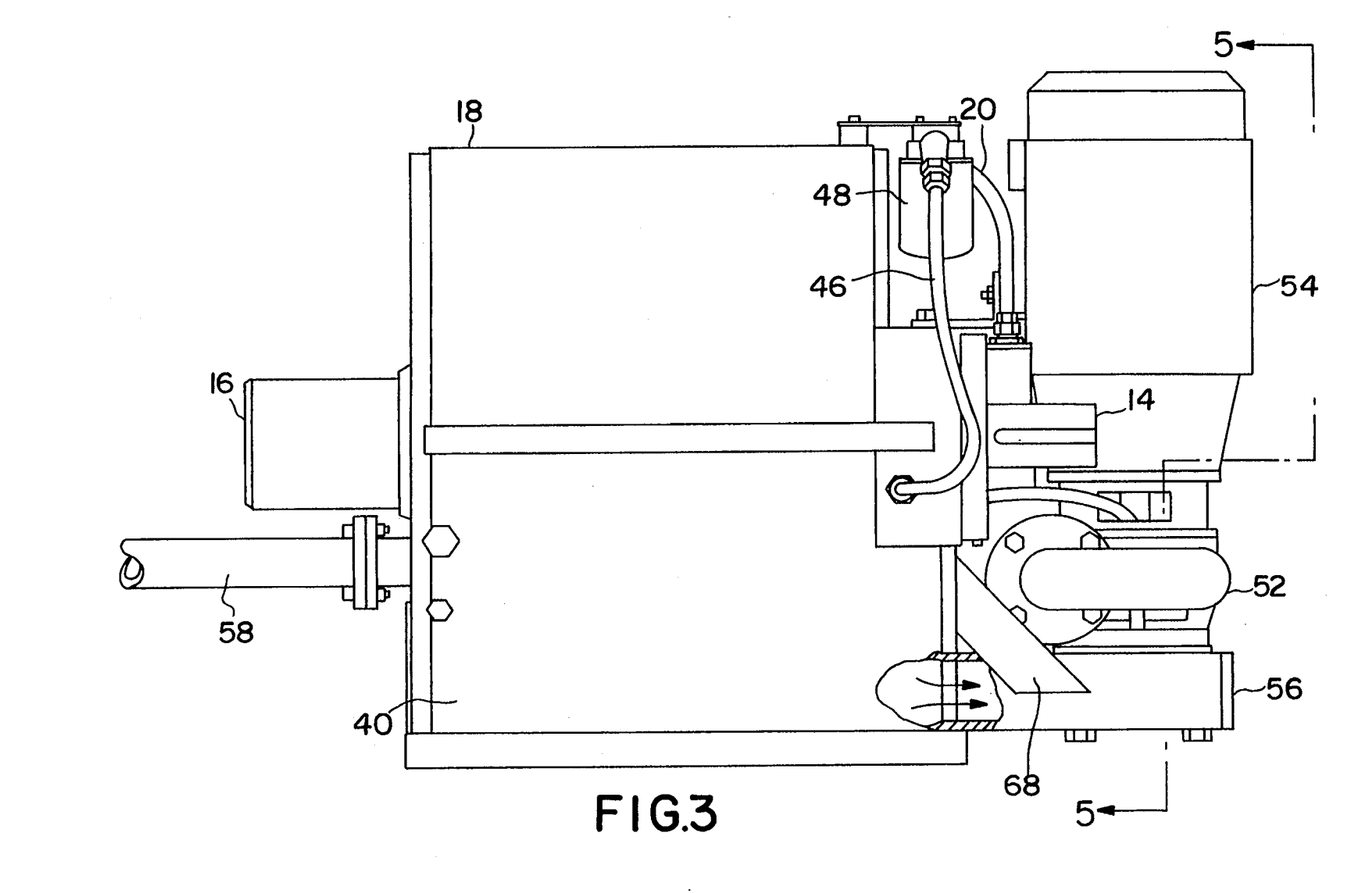
FIG. 3 is a side elevation of the transmission device and pump shown in FIG. 2 partially cut away to illustrate flow of the lubricant fluid into the pump.

In addition to lubricating internal components of transmission device 12, the lubricant fluid is circulated at a relatively high flow rate through heat exchanger 50. Apparatus provided for this purpose includes a centrifugal pump 52 driven in this case by an electric motor 54. It should be appreciated, however, that other suitable means of operatively driving pump 52 may also be utilized within the scope of the present invention. As can be seen most clearly in FIG. 3, pump 52 draws the lubricant fluid through a rigid fluid passage conduit 56, upon which pump 52 and motor 54 are vertically mounted. The lubricant fluid is then passed into a first outflow pipe 58, where it is directed into heat exchanger 50.

Heat exchanger 50 includes a number of radiating elements 60 through which the lubricant fluid is circulated. In the illustrated embodiment, heat exchanger 50 is a oil-water heat exchanger. Thus, much of the generated heat present in the lubricant fluid is transferred to water within the casing of heat exchanger 50. Such water may enter and exit heat exchanger 50 through water ingress pipe 62 and water egress pipe 64, respectively. After passing through radiating elements 60, the lubricant fluid flows back into transmission device 12 through a second outflow pipe 66. It should be appreciated that pump 42 may be eliminated by diverting a portion of the lubricant fluid returning via pipe 66 to the port defined by the connection of hose 46 to housing 18.

Within transmission 12, the lubricant fluid is directed through plate assembly 36 to effect cooling of the interleaved plates. The lubricant fluid is then poured into the sump at a relatively high rate, which produces air bubbles therein. As discussed above, such air bubbles have often caused lubricant circulation apparatus utilized with many prior art transmission systems to exhibit certain undesirable characteristics. Particularly, discontinuities have often developed in the flow of the lubricant fluid which could falsely be interpreted as a operational fault. Additionally, seal failures have often occurred in the pumps, resulting in down time so that appropriate maintenance could be performed.

Toward this end, the mounting of pump 52 is in contrast to many prior art transmission systems in which the pump may have been located near the heat exchanger and oriented horizontally. The positioning of pump 52 proximate to transmission 12 places the pump suction closer to the sump, thereby reducing the possibility of cavitation. Additionally, the orientation of pump 52 vertically facilitates removal of air from the lubricant fluid, as will be more fully discussed below.

Figure 4:
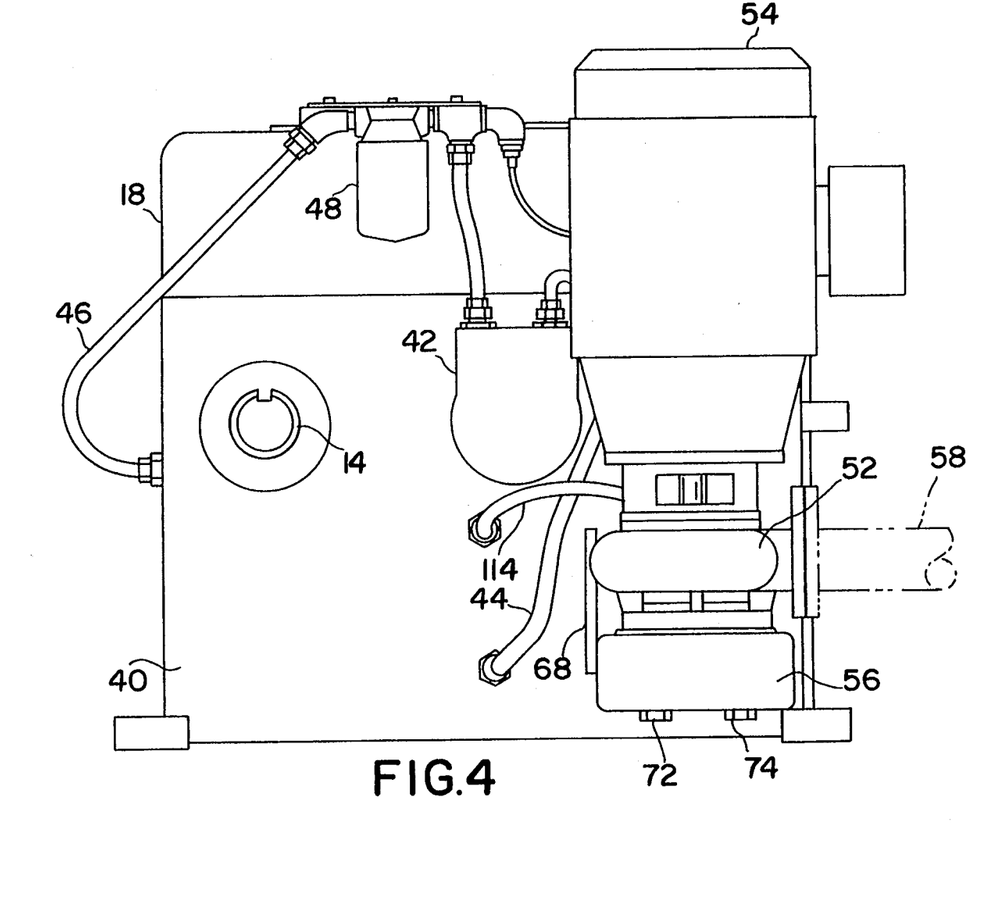
FIG. 4 is an end view of the transmission device and pump shown in FIG. 2.
Figure 5:
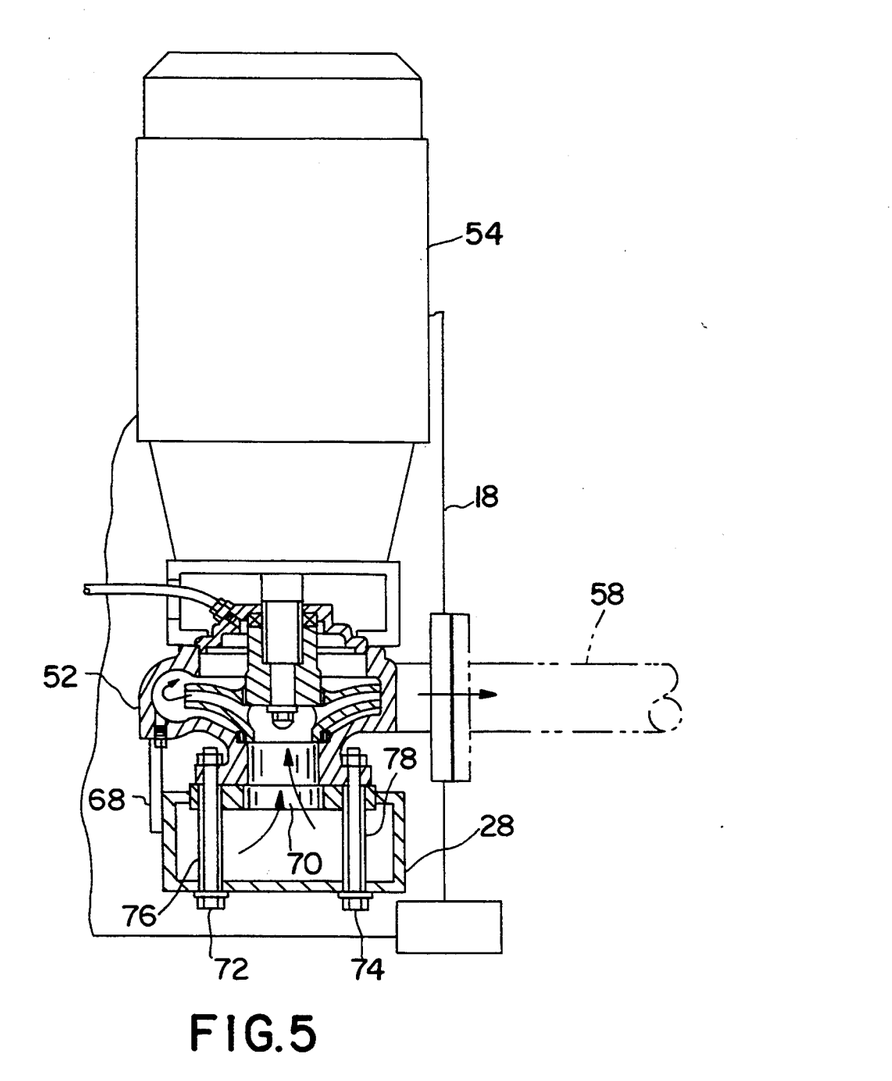
FIG. 5 is a partial cross section as taken along lines 5—5 of FIG. 3.

Referring now particularly to FIGS. 4 and 5, the manner in which pump 52 is mounted in the exemplary embodiment will be described. As shown, conduit 56 is preferably a longitudinal section of substantially rectangular tubing. The top portion of conduit 56 defines a fluid port 70 generally in register with a pump inlet of pump 52. A plurality of mounting bolts, such as mounting bolts 72 and 74, extend upward through conduit 56 for securing pump 52 thereto as shown. Preferably, such bolts are inserted through concentric tubes, such as tubes 76 and 78, which are seal-welded on the top and bottom thereof to reduce leakage of the lubricant fluid which may otherwise occur. As shown, fluid port 70 may be defined in a thickened portion of fluid conduit 56 to provide an enhanced mounting surface for pump 52. It should be appreciated, however, that other suitable means of maintaining pump 52 according to the present invention may also be utilized.

Figure 6:
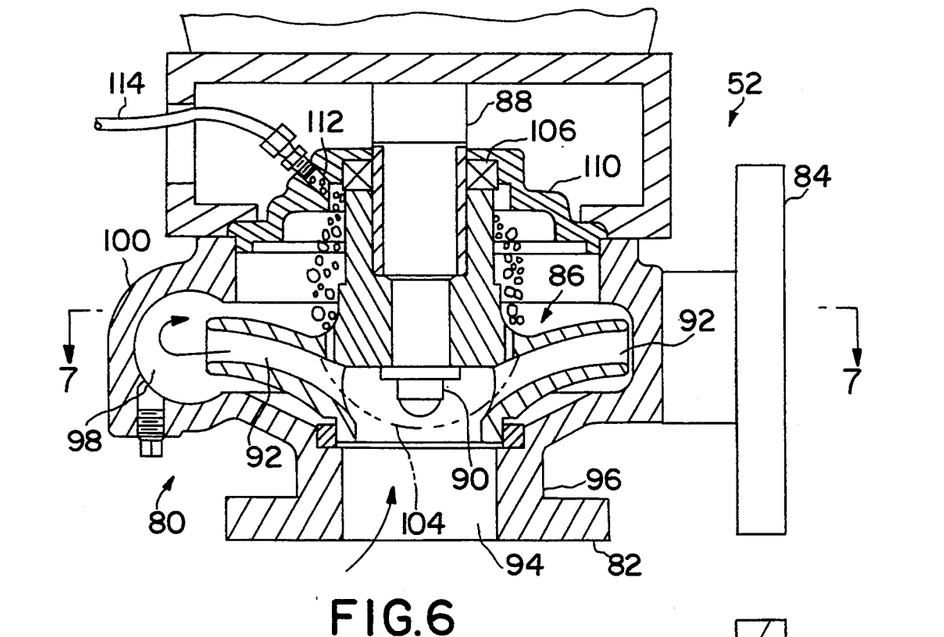
FIG. 6 is an enlarged view in partial cross section of the centrifugal pump shown in FIG. 5.
Figure 7:
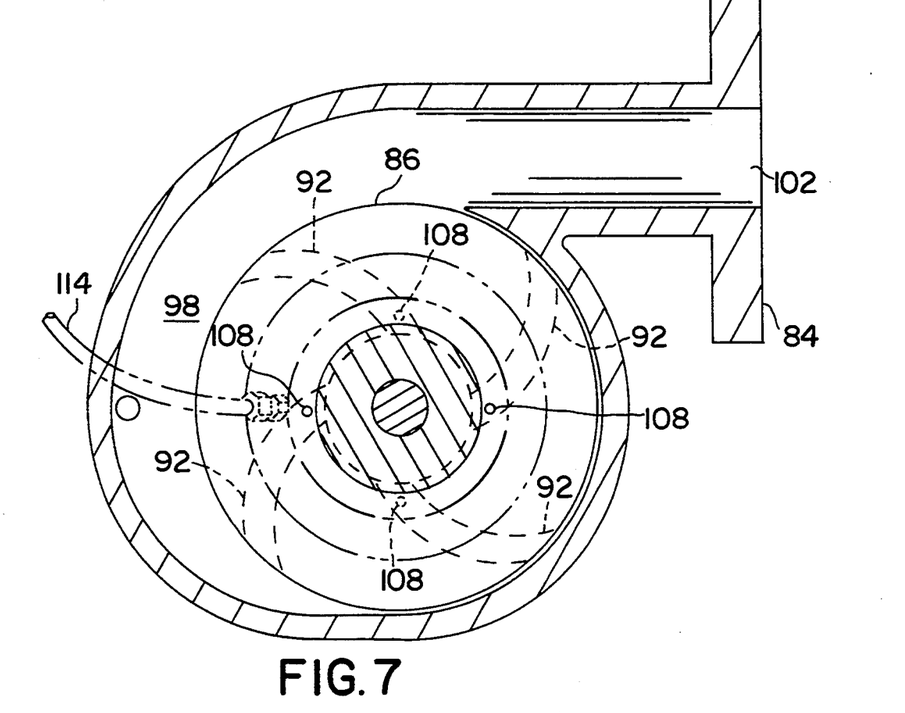
FIG. 7 is a cross sectional view as taken along lines 7—7 of FIG. 6.

The construction of pump 52 may be most easily understood with reference to FIGS. 6 and 7. Generally, pump 52 includes a pump housing 80 having mounting flanges 82 and 84 for connecting conduit 56 and outflow pipe 58, respectively. A rotatable impeller 86 is mounted inside of housing 80. Impeller 86 is attached to a depending spindle 88 of motor 54 via an attachment bolt 90 or other suitable means of attachment.

A number of curved passages 92 are defined in impeller 86. Operative rotation of impeller 86 causes the lubricant fluid to be drawn by centrifugal action into a pump inlet 94 defined in a lower portion 96 of pump housing 80. After flowing through curved passages 92, the lubricant fluid passes through a volute 98 defined in an intermediate portion 100 of pump housing 80. Volute 98 extends into fluid outlet 102 as shown.

To illustrate the problems caused by air bubbles in the lubricant fluid, consider air pocket 104 shown in FIG. 6. Air pocket 104 is formed by the centrifugal action of impeller 86 upon the lubricant fluid containing air bubbles. Specifically, the higher specific weight of the lubricant fluid causes it to be directed radially outward. The lower specific weight of the air, on the other hand, causes it to collect near the axis of rotation of impeller 86.

During operation of a prior art pump, which would generally have been mounted horizontally, air pocket 104 may have continued to enlarge until air passed through passages 92. This occurrence may be perceived as a temporary discontinuity in the flow of the lubricant fluid. Additionally, air passing through curved passages 92 in this manner may have tended to collect behind impeller 86. Over time, this could result of failure of pump seals, such as seal 106, due to drying. The failure of such pump seals was despite the presence of a flooding hose which provided fluid communication between the volute and the pump housing near such seals.

The present invention overcomes these problems utilizing a combination of features. First, as distinguished from many prior art pumps, pump 52 is mounted in an orientation such that the lubricant fluid is drawn into impeller 86 vertically. This vertical orientation advantageously utilizes the centrifugal action of impeller 86 to facilitate removal of the air. Because the air is separated from the lubricant fluid at this location, a plurality of air escape orifices 108 may be defined in impeller 86 to provide fluid communication between the interior of impeller 86 and an upper portion 110 of pump housing 80.

Air escape orifices 108 thus permit the collecting air to escape into upper portion 110 of pump housing 80 before air pocket 104 becomes undesirably large. As can be seen, the illustrated embodiment utilizes four such air escape orifices 108. Each of air escape orifices 108 may have a diameter of approximately one-fourth of an inch. As mentioned above, the number and size of such air escape orifices may be varied as desired so long as the function of air removal is facilitated while maintaining structural integrity of impeller 86. Preferably, the air escape orifices will be distributed about impeller 86 in a balanced arrangement. In the past, holes have been provided in the impellers of large pumps in a location similar to that of orifices 108. The purpose of such holes, however, was the equalization of thrust forces imposed on the impeller, and was unrelated to the air removal purposes of the present invention.

The air rising through orifices 108 may then simply pass through an air escape hole 112 defined in upper portion 110 of pump housing 80. As a result, no air pocket is allowed to form within upper portion 110 of pump housing 80 which may dry seal 106. In presently preferred embodiments, it is further desirable to connect an air return hose 114 to air escape hole 112 via a hose fitting or other appropriate means of attachment. The other end of air escape hose is preferably connected to housing 18 of transmission 12, as shown in FIG. 1. This permits lubricant fluid in the upper portion 110 of pump housing 80, along with any escaping air, to simply pass back to the sump.

It should be appreciated by those skilled in the art that the principles of the present invention are applicable to many types of mechanical devices. Further, it is to be distinctly understood that the term "lubricant fluid" as appearing in the claims may be interpreted as "cooling fluid" in applications in which such fluid may not also be used for lubrication purposes. It should be also appreciated that the invention is not limited to applications involving lubricant fluid but may be advantageously utilized in many applications in which it is desirable to remove a gas from another fluid having a higher specific weight. In addition, it should be understood that aspects of the various embodiments may be interchanged both in whole or in part.

These and other modifications and variations to the present invention may be practiced by those of ordinary skill in the art, without departing from the spirit and scope of the present invention, which is more particularly set forth in the appended claims.

What is claimed is:

1. A transmission system for transmitting mechanical power from a source of mechanical power to a power consuming load, said transmission system comprising:
   a gear box having an input shaft operatively connected to the source of mechanical power and an output shaft operatively connected to the power consuming load, said gear box defining a sump for maintaining a lubricant fluid therein;
   a pump having a pump housing defining a pump inlet, a pump outlet and further defining an air exhaust hole in an upper portion thereof, said centrifugal pump having an impeller defining at least one air escape orifice to provide fluid communication between said pump inlet and said upper portion of said pump housing;
   fluid inflow means for providing fluid coupling between said sump and said pump inlet to permit inflow of the lubricant fluid from the sump into the centrifugal pump;
   fluid outflow means for providing a fluid flow path between said pump outlet and said gear box to permit return flow of the lubricant fluid from said centrifugal pump back to said sump;
   a heat exchanger operatively connected in the return flow path of said fluid outflow means to dissipate heat in the lubricant fluid; and
   means for operatively driving said impeller of said centrifugal pump.

2. A transmission system as set forth in claim 1, wherein said pump is a centrifugal pump.

3. A transmission system as set forth in claim 2, wherein said at least one air escape orifice is located radially proximate to an axis of rotation of said impeller.

4. A transmission system as set forth in claim 3, further comprising an air return hose operatively extending from said air exhaust hole back to the gear box to permit the lubricant fluid in which the air is entrained to flow back to said gear box.

5. A transmission system as set forth in claim 3, wherein said at least one air escape orifice comprises between two and four air escape orifices, inclusive.

6. A transmission system as set forth in claim 2, wherein said pump housing is fixedly mounted proximate to the gear box in a substantially vertical orientation.

7. A transmission system as set forth in claim 6, wherein said pump housing is mounted upon said rigid fluid passage conduit.

8. A transmission system as set forth in claim 7, wherein said rigid fluid passage conduit comprises a longitudinal section of substantially rectangular tubing defining a fluid port in a top surface thereof, said fluid port generally in register with said pump inlet.

9. A transmission system as set forth in claim 1, wherein said gear box comprises a controlled start transmission device operative to selectively transmit mechanical power from said input shaft to said output shaft.

10. Lubricant circulation apparatus for circulating a lubricant fluid maintained in a sump of a mechanical device, said system comprising:
    a centrifugal pump having a pump housing defining a pump inlet and a pump outlet, said centrifugal pump mounted such that the lubricant fluid is operatively drawn upward into an impeller thereof from said pump inlet and passed to said pump outlet;

air removal means for facilitating removal of air in the lubricant fluid from the centrifugal pump, said air removal means including at least one air escape orifice defined in said impeller to permit the air to rise from said pump inlet into an upper portion of said pump housing and further including an air exhaust hole defined in said upper portion of said pump housing to permit the air to exhaust therefrom;

mounting means for fixedly mounting said centrifugal pump proximate to said mechanical device;

a fluid passage conduit operatively coupled between the sump and said pump inlet to permit inflow of the lubricant fluid into said centrifugal pump;

fluid outflow means for providing a fluid flow path between said pump outlet and the mechanical device to permit return flow of the lubricant fluid from said centrifugal pump back into the sump; and means for operatively driving said impeller of said centrifugal pump.

11. Lubricant circulation apparatus as set forth in claim 10, wherein said at least one air escape orifice is located radially proximate to an axis of rotation of said impeller to provide fluid communication between said pump inlet and said upper portion of said pump housing.

12. Lubricant circulation apparatus as set forth in claim 11, wherein said at least one air escape orifice comprises between two and four air escape orifices, inclusive.

13. Lubricant circulation apparatus as set forth in claim 10, wherein said air removal means further includes an air return hose extending from said air exhaust hole.

14. Lubricant circulation apparatus as set forth in claim 13, wherein said air return hose operatively extends from said air exhaust hole back to the mechanical device to permit the lubricant fluid in which the air is entrained to be fed back to said sump.

15. Lubricant circulation apparatus as set forth in claim 10, wherein said mounting means fixedly mount said pump housing proximate to the mechanical device in a substantially vertical orientation.

16. Lubricant circulation apparatus as set forth in claim 15, wherein said fluid passage conduit is a rigid fluid passage conduit upon which said pump housing is mounted.

17. Lubricant circulation apparatus as set forth in claim 16, wherein said rigid fluid passage conduit comprises a longitudinal section of substantially rectangular tubing defining a fluid port in a top surface thereof, said fluid port generally in register with said pump inlet.

18. Lubricant circulation apparatus as set forth in claim 10, wherein said fluid outflow means includes a heat exchanger operatively connected in the fluid flow path to dissipate heat in the lubricant fluid.

19. A transmission system for selectively transmitting mechanical power from a source of mechanical power to a power consuming load, said transmission system comprising:

a controlled start transmission device having an input shaft operatively connected to the source of mechanical power and an output shaft operatively connected to the power consuming load and operative to selectively transmit the mechanical power therebetween, said controlled start transmission device further having a transmission housing defining a sump for maintaining a lubricant fluid therein;

a centrifugal pump having a pump housing defining a pump inlet, a pump outlet and further defining an air exhaust hole in an upper portion thereof, said centrifugal pump having an impeller defining at least one air escape orifice located radially proximate to an axis of rotation of said impeller to provide fluid communication between said pump inlet and said upper portion of said pump housing;

mounting means for fixedly mounting said centrifugal pump proximate to said transmission device in a substantially vertical orientation;

a fluid passage conduit operatively coupled between said sump and said pump inlet to permit inflow of the lubricant fluid into said centrifugal pump;

fluid outflow means for providing a fluid flow path between said pump outlet and said transmission device to permit return flow of the lubricant fluid from said centrifugal pump back into said sump;

a heat exchanger operatively connected in the return flow path of said fluid outflow means to dissipate heat in the lubricant fluid; and means for operatively driving said impeller of said centrifugal pump.

20. A transmission system as set forth in claim 19, wherein said fluid passage conduit is a rigid fluid passage conduit upon which said pump housing is mounted.

21. A transmission system as set forth in claim 20, wherein said rigid fluid passage conduit comprises a longitudinal section of substantially rectangular tubing defining a fluid port in a top surface thereof, said fluid port generally in register with said pump inlet.

22. A transmission system as set forth in claim 19, further comprising an air return hose operatively extending from said air exhaust hole back to said transmission device to permit the lubricant fluid entrained in the air to flow back to said sump.

23. A centrifugal pump device comprising:

a pump housing adapted to be mounted in a substantially vertical orientation and having a lower portion, an intermediate portion and an upper portion, said lower portion defining a pump inlet and said intermediate portion defining a volute in fluid communication with a pump outlet;

an impeller mounted in said pump housing radially inward of said volute and rotatable about a substantially vertical axis of rotation, said impeller operative to draw a selected fluid through said pump inlet and pass the selected fluid to said pump outlet;

gas removal means for facilitating removal of a gas having a specific weight less than a specific weight of the selected fluid, said gas removal means including at least one gas escape orifice defined in said impeller to permit the gas to rise from said pump inlet into said upper portion of said pump housing and further including an air exhaust hole defined in said upper portion of said pump housing to permit the gas to exhaust therefrom; and means connected to said impeller for rotating said impeller about said axis of rotation.

24. A centrifugal pump device as set forth in claim 23, wherein said gas removal means further comprises a gas return hose extending from said gas exhaust hole to selectively direct the gas exhausted from said upper portion of said pump housing.

25. A centrifugal pump device as set forth in claim 24, wherein said at least one gas escape orifice comprises between two and four gas escape orifices, inclusive.

26. A centrifugal pump device as set forth in claim 25, wherein each of said gas escape orifices are substantially one-fourth of an inch in diameter.

* * * * *